United States Patent [19]

Beutler et al.

[11] Patent Number: 4,897,873

[45] Date of Patent: Jan. 30, 1990

[54] MULTIPURPOSE HINGE APPARATUS FOR FOLDABLE TELEPHONES

[75] Inventors: Scott D. Beutler, Hoffman Estates; James H. Barber, Palatine, both of Ill.

[73] Assignee: Motorola, Inc., Schaumburg, Ill.

[21] Appl. No.: 267,156

[22] Filed: Nov. 4, 1988

[51] Int. Cl.[4] .................. H04R 1/03; E05D 11/10; F16C 11/06

[52] U.S. Cl. .................. 379/433; 16/292; 16/325; 403/93; 403/96

[58] Field of Search .................. 379/433; 403/95, 96, 403/93; 16/227, 297, 304, 292, 321, 325, 333, 334, 344

[56] References Cited

U.S. PATENT DOCUMENTS

| D. 297,734 | 9/1988 | Soren et al. | 379/433 |
|---|---|---|---|
| 346,046 | 7/1886 | Howe | 16/333 |
| 2,001,507 | 5/1935 | Stribling | 16/333 |
| 2,643,301 | 6/1953 | Cornfeld | 379/433 |
| 3,476,886 | 11/1969 | Ferrari et al. | 379/433 |
| 3,551,607 | 12/1970 | Tommasi | 379/433 |
| 4,018,998 | 4/1977 | Wegner | 379/433 |
| 4,471,493 | 9/1984 | Schober | 455/90 |
| 4,577,986 | 3/1986 | Wang | 16/334 |
| 4,645,371 | 2/1987 | Wang | 16/332 |

FOREIGN PATENT DOCUMENTS

| 208031 | 3/1960 | Austria | 16/334 |
|---|---|---|---|
| 1406689 | 6/1965 | France | 403/93 |
| 59-135959 | 4/1984 | Japan | 379/433 |
| 103061 | 12/1963 | Norway | 16/333 |
| 976404 | 11/1964 | United Kingdom | 16/334 |
| 999912 | 7/1965 | United Kingdom | 16/334 |

OTHER PUBLICATIONS

Realistic Owner's Manual: Duofone ET-415 Cordless Electronic Telephone; Cat. No. 43-555; 1984.
Panasonic KX-T3000 Easa-Phone Cordlessphone FCC Transmitter Type Acceptance Filing-Exhibits D,E,F, and H of type acceptance No. ACJ96NKX-T3000.

Primary Examiner—Jin F. Ng
Assistant Examiner—Danita R. Byrd
Attorney, Agent, or Firm—Raymond A. Jenski; Rolland R. Hackbart

[57] ABSTRACT

A multipurpose hinge apparatus for a foldable telephone includes a flip element and a hookswitch. The flip element is held in the closed and open positions by an enclosed cam element which follows recesses in one shaft securing the hinge elements. The hookswitch is activated by another enclosed cam which follows a recess in a second shaft.

4 Claims, 3 Drawing Sheets

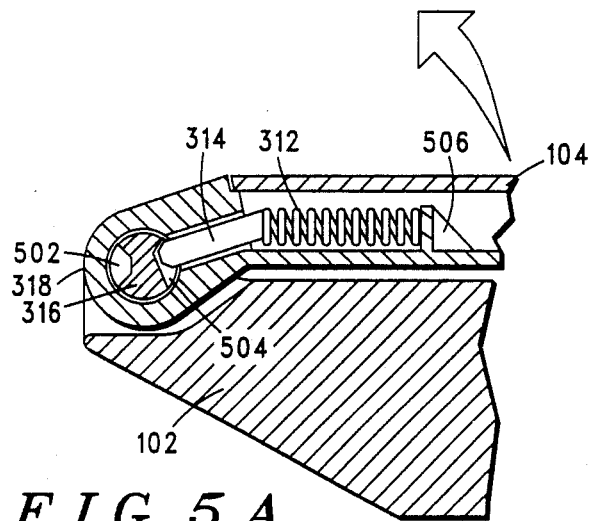
FIG.5A
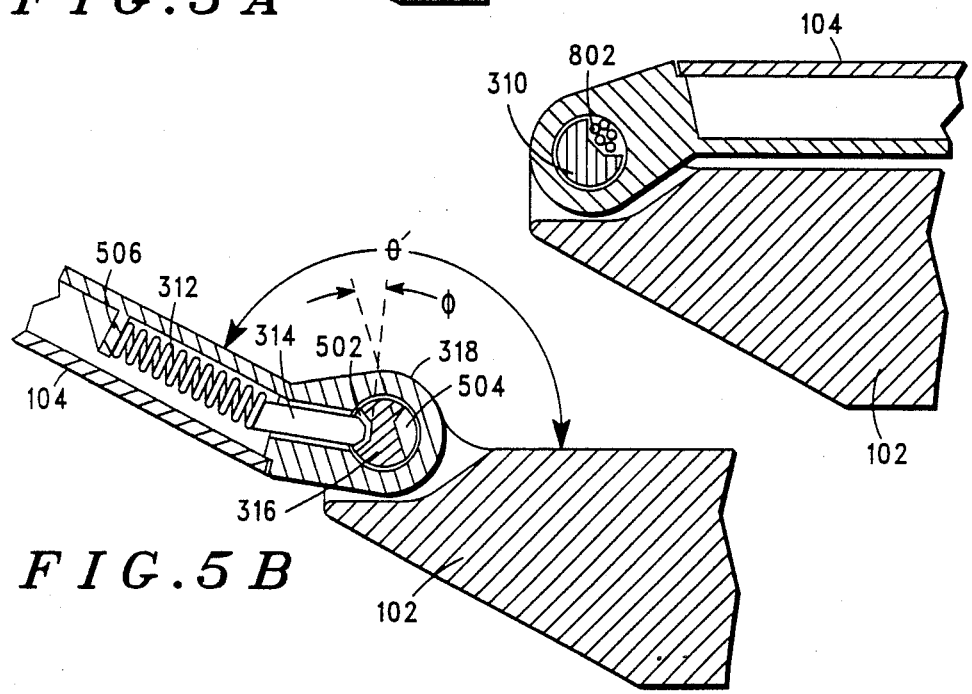
FIG.7
FIG.5B
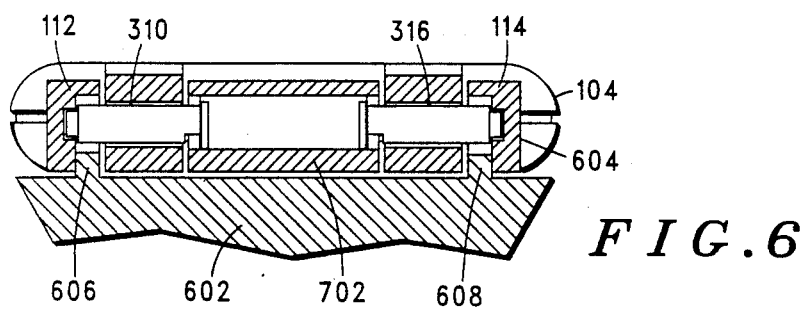
FIG.6

MULTIPURPOSE HINGE APPARATUS FOR FOLDABLE TELEPHONES

BACKGROUND OF THE INVENTION

This invention relates generally to hinged housings for miniature electronic equipment and more particularly to portable radiotelephones which utilize hinged housings for folding elements.

Telephones utilizing two housing elements, connected with some type of hinging mechanism, are common in wireline telephone sets and have become more common in landline wireless extension phones. This folding arrangement allows for the telephone to be more compact when the two housings are folded upon themselves.

Radiotelephones which utilize this type of design typically have most of the electronics within the larger of the two housings. The smaller housing, which will be called the flip element hereinafter, normally contains the microphone and ringing element. Because the microphone and ringing element must make electrical connection to the electronics within the body of the radiotelephone, a means of connection through the hinge area is needed. For good acoustical performance, the flip element must be held in an optimum position relative to the body. In so doing, the microphone is positioned a desired distance from the user's mouth.

This hinging design may have the capability of producing an on-hook condition when the flip element is in the "closed" position and an off-hook condition when the flip element is "opened" to its extended position. A radiotelephone which employed the position of the flip element for control purposes was described in U.S. Pat. No. 4,845,772. Additionally, some cordless telephones which offer the hinged flip element design have been offered in the United States. One such cordless phone is manufactured by Radio Shack as Duofone model no. ET-415. For the Duofone ET-415, two shafts with cored centers connect the flip element to the main housing or body. The wires are dressed from inside the flip element, through the shaft centers, and into the body. The flip element is held in the open or closed position by two spring loaded fingers which press on the flip element and into depressions on the flip element exterior. The off-hook and on-hook switching is performed by a raised section on the external surface of the flip element which depresses a lever of a switch in the Duofone body when the flip element is closed upon the body. However, by performing the detenting and switching functions external to the housings, the possibility exists that small foreign objects can jam the spring loaded fingers to prevent the switching or detenting operation. Furthermore, the fingers could also be broken which would prevent proper operation.

SUMMARY OF THE INVENTION

It is, therefore, one object of the present invention to provide a moveable joint to connecting the flip element to the main housing.

It is another object of the invention to provide a mechanism which holds the flip element in either a position covering the keypad (on-hook) or in a position exposing the keypad (off-hook).

It is another object of the present invention to produce an on-hook condition when the flip element is closed and an off-hook condition when the flip element is opened.

It is a further object of the invention to allow for electrical connection between the microphone and ringing element within the flip element and the body containing the majority of the electrical components.

Accordingly, these and other objects are realized in the present invention which encompasses a portable radiotelephone having a main housing and an attached movable flip element as described herein.

BRIEF DESCRIPTION OF THE DRAWINGS

FIGS. 5A and 5B are cut-away side views of the detent mechanism where the flip element is shown in both the open and closed position.

FIG. 6 is a sectional view of the hinge mechanism of the present invention.

FIG. 7 shows the means of connecting the wires from the hookswitch, ringing element and microphone to the body.

DESCRIPTION OF THE PREFERRED EMBODIMENT

Figure 1:
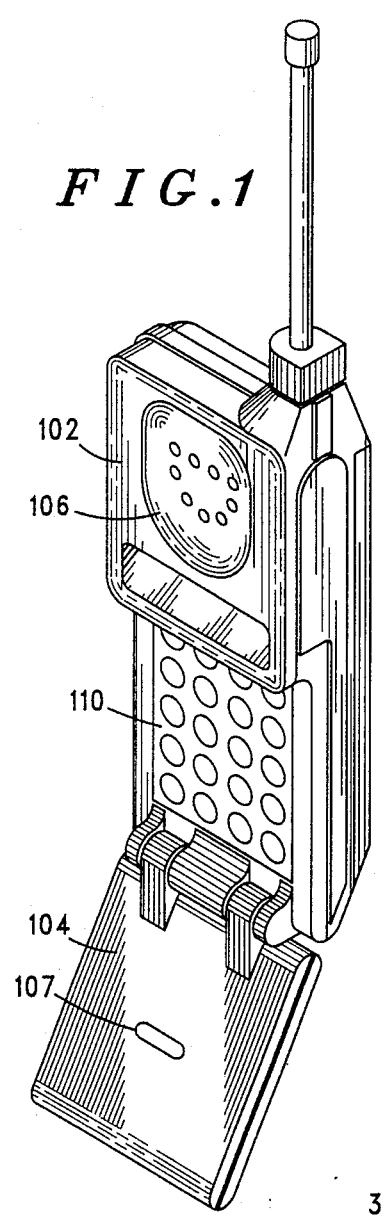
FIG. 1 is an isometric drawing of a portable radiotelephone which may employ the present invention.

A portable radiotelephone adapted to be used in a cellular radiotelephone system is shown in FIG. 1. This portable unit consists basically of two readily apparent portions, a body portion 102 and a flip element portion 104. The drawing of FIG. 1 shows the flip element in an "open" position such that a user of the portable unit may listen via earpiece 106 and may speak into the microphone 107. The dial or keypad 110 consists of a plurality of buttons numbered one through zero, #, and *, in a familiar telephone arrangement. The keypad 110 also may have additional function buttons such as "send", "end", "on/off", and other buttons associated with memory recall.

Figure 2:
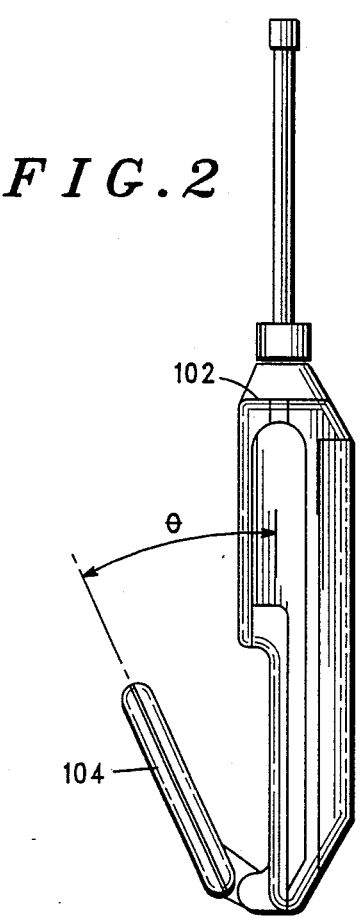
FIG. 2 is a side view of the radiotelephone where the flip element is nearing the closed position.

When the flip element 104 is open as shown in FIG. 1, the portable cellular telephone can be in the state of answering or making a telephone call. Such a state is commonly known as "off-hook". Upon completion of the telephone call, the user may hang-up the portable telephone by moving the flip element into a closed position. This hanging-up may be accomplished by causing the flip element 104 to rotate about the axis of hinges 112 and 114 so that the flip element 104 rests against the keypad 110. This action activates a "hookswitch" which causes the telephone call to be terminated. The closing of the flip element 104 can best be perceived in FIG. 2.

Figure 3:
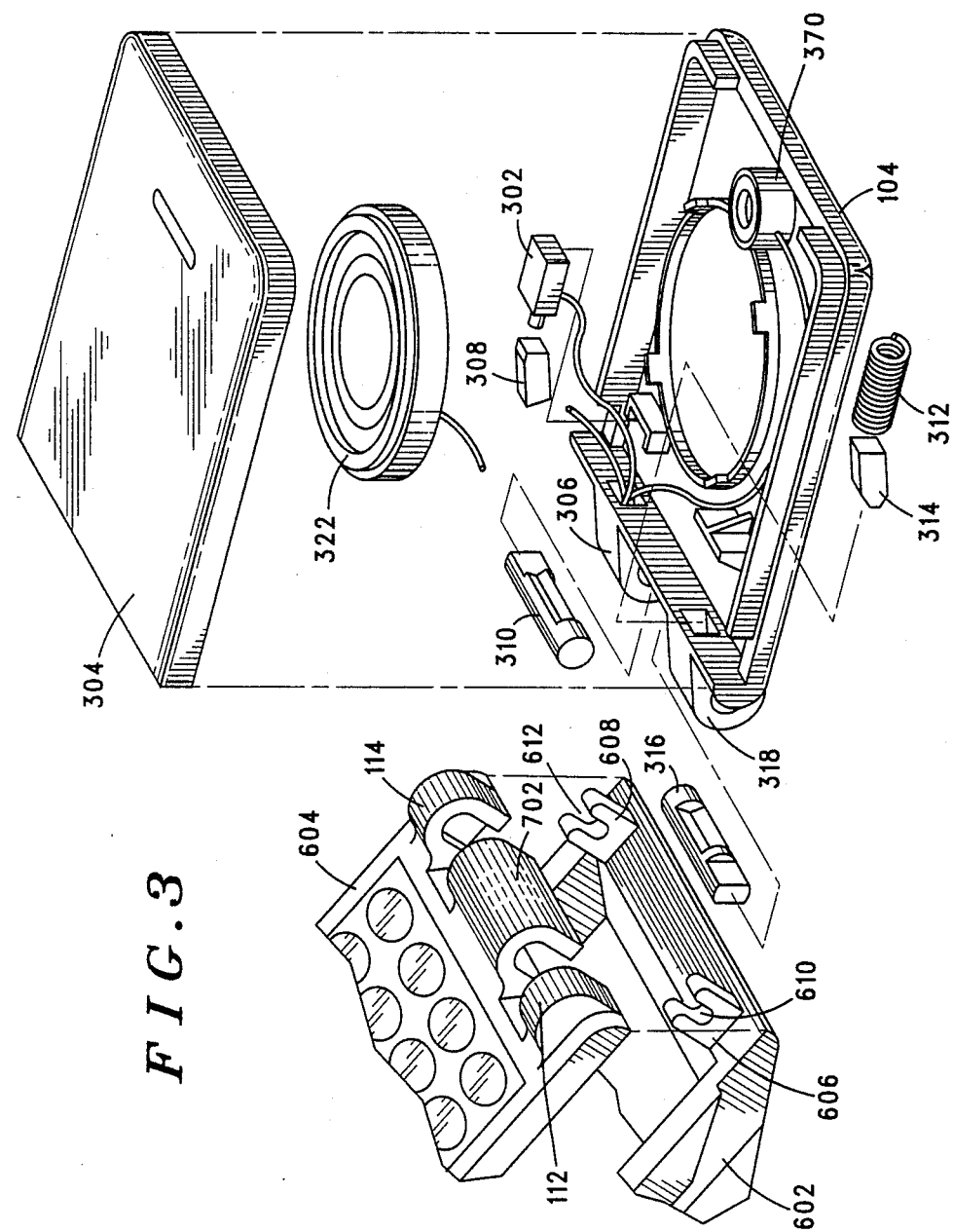
FIG. 3 is an exploded view of the front housing and the flip element illustrating the components which are contained within the flip element.

The hookswitch in the preferred embodiment is located within the flip element 104 and may be seen in FIG. 3. Activation of the hookswitch occurs in the preferred embodiment when the angle between the body 102 and the flip element 104 equals approximately 45°. A conventional pushbutton switch 302 is placed in position within the flip element 104 behind front housing 304. As the flip element 104 rotates about the axis of hinges 112 and 114, a switch actuator 308, which is placed in the hinge knuckle 306, rides on the surface of the hinge shaft 310. The hinge shaft forces the switch actuator 308 to push the button of the switch 302 as the flip element 104 rotates from the on-hook position to the offhook position.

Figure 4:
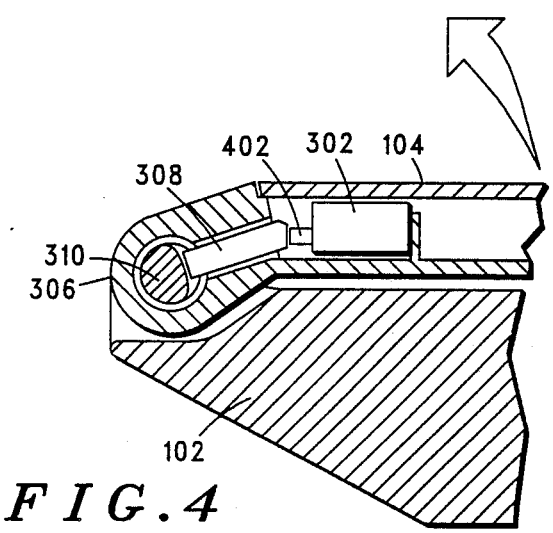
FIG. 4 is a cut-away side view of the hookswitch mechanism which may be employed in the radiotelephone of FIG. 1.

FIG. 4 is a side view of the details that allow the hookswitch to function. It may be perceived that as the flip element 104 rotates in the direction shown, the switch actuator 308 moves in a direction such that the switch button 402 becomes depressed thereby signaling an off-hook condition. When the switch pushbutton 402 is not pressed, the state of the radiotelephone is on-hook. By having the switch 302 and switch actuator 308 contained within the hinge knuckle 306, accidental activation of the switch, or jamming or breaking of the switch actuator is prevented.

In the preferred embodiment, the flip element 104 is held in the open or closed position by a combination of elements shown in FIG. 3. A detent cam 314 is placed within the hinge knuckle 318 and forced against the hinge shaft 316 by a spring 312. The design of the hinge shaft 316 allows the flip element 104 to be held at an obtuse (for example $\theta=150°$) from the on-hook or closed position.

A more detailed view of the detent cam mechanism can be seen in FIGS. 5A and 5B. FIG. 5A illustrates the position of recesses 502 and 504 when the flip element is in the closed, on-hook, position. FIG. 5B illustrates the position of the recesses when the flip element is in the open, off-hook, position. When opening the flip element, the cam detent 314 moves out of a recess 504 in hinge shaft 316 and onto the full diameter surface of the shaft 316. The spring 312, placed between a wall 506 and the detent cam, constantly forces the detent cam 314 against the shaft 316. As the flip element continues to rotate to the open or off-hook condition, the detent cam 314 continues to push against the shaft and then force itself into the recess 502. The force of the detent cam 314 in the recess 502 holds the flip element 104 in the desired position. It should be noted that recesses 502 and 504 have planar bottom surfaces which enable the cam 314 to contact the bottom and side surfaces and act as a detent. The imaginary planes formed by the bottom surfaces of the recesses intersect in an acute angle, $\phi$, which is related to the angle of flip element 104 opening $\theta$. In the preferred embodiment, the two angles, $\phi$ and $\theta$, sum to approximately 180° when the flip element 104 is in the open position as shown in FIG. 5B. The side surfaces of each recess further act to restrain the cam when in the detent position and are angled with respect to the plane of the bottom surface. The design of the shaft 316 allows the flip element 104 to open or close without further user assistance when it is within 45° of either position. The flip element also has the ability to overtravel the open position by an amount such as 30°, if forced, and return to the open position automatically when the force is removed. The possibility of breaking or jamming the positioning mechanism is removed by having the entire mechanism contained within the flip element.

In the preferred embodiment, the housing of the body 102 is assembled from two parts shown in FIG. 3 as rear housing 602 and front housing 604. The flip element 104 is connected to the body by the hinge shafts 310 and 316 mentioned above. When the rear housing 602 of the body 102 and the front housing 604 of the body are snapped together, the ribs 606 and 608 nest within the hinges 112 and 114. The slots 610 and 612 align themselves concentrically with blind holes cored into the outer walls of the hinges 112 and 114. The shafts 310 and 316 push through the holes in their respective hinge knuckles 306 and 318, through the holes in the ribs 606 and 608, and into the slots cored into the outer walls of the hinges 112 and 114 which prevent the shafts from rotating. A cut-away view can be seen in FIG. 6. A clip is then placed within the center knuckle 702 to prevent the shafts 310 and 316 from sliding out. In the preferred embodiment, the shafts may only be removed when the flip element is in the closed position.

Electrical connection is made from the microphone 320, ringing element 322 and the hookswitch 302 via wires which pass through the hinge knuckle 306 through a slot 802 in the hinge shaft 310 and into the main housing. The routing of the wires can be seen in FIG. 7.

In summary, a multipurpose hinge mechanism for a folding portable radiotelephone has been shown and described. This novel apparatus fixes the problem of accidental hookswitch actuation or breaking or jamming of the detenting mechanism in a portable radiotelephone. The hookswitch and detent mechanism are protected from abuse or misuse by having them internal to the flip element. The hookswitch is activated by movement of a switch actuator when the flip element rotates about the shafts. The cam detent holds the flip element in position by being forced into a recess in the shaft.

Also, the hookswitch, microphone and ringing element are connected to the body's electrical components via wire which pass through the hinge knuckle, through a slot in the shaft and then into the body.

We claim:

1. A hinge apparatus for a foldable telephone apparatus having a body portion and a flip element portion, the hinge apparatus capable of maintaining the flip element portion in at least two positions of rotation relative to the body portion, a first position being parallel to a front surface plane of the body portion and a second position being at an obtuse angle to the front surface plane of the body portion, the hinge apparatus comprising:
   a first cylindrical hinge shaft rotatably coupling the flip element portion to the body portion;
   first and second recesses disposed in the wall of said first cylindrical hinge shaft, said first and second recesses having essentially planar bottom surfaces, the plane of said essentially planar bottom surface of said first recess intersecting the plane of said essentially planar bottom surface of said second recess an acute angle; and
   a first cam disposed within said flip element portion and having at least one flat surface which contacts said essentially planar bottom surface of said first recess when the flip element portion is in the first position and which contacts the essentially planar bottom surface of said second recess when the flip element portion is in the second position.

2. A hinge apparatus in accordance with claim 1 further comprising a second cylindrical hinge shaft further coupling the flip element portion to the body portion and having a recess in the side wall of said second cylindrical shaft.

3. A hinge apparatus in accordance with claim 2 further comprising a second cam disposed within said flip element portion and having a surface which contacts said recess in the side wall of said second cylindrical shaft.

4. A hinge apparatus in accordance with claim 3 further comprising a hook switch coupled to said second cam.

* * * * *